US007265887B2

(12) United States Patent  
Orcutt (10) Patent No.: US 7,265,887 B2  
(45) Date of Patent: Sep. 4, 2007

(54) TWO AXIS LOW INERTIA TORSIONAL HINGED OPTICAL DEVICE

(75) Inventor: John W. Orcutt, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

(21) Appl. No.: 11/070,580

(22) Filed: Mar. 2, 2005

(65) Prior Publication Data

US 2006/0198003 A1 Sep. 7, 2006

(51) Int. Cl.  
*G02B 26/08* (2006.01)

(52) U.S. Cl. .................................... 359/224

(58) Field of Classification Search ........ 359/223–226, 359/291  
See application file for complete search history.

(56) References Cited

U.S. PATENT DOCUMENTS 6,295,154 B1 * 9/2001 Laor et al. .................. 359/223

6,498,326 B1 * 12/2002 Knappe ...................... 219/625

* cited by examiner

*Primary Examiner*—Euncha P. Cherry  
(74) *Attorney, Agent, or Firm*—William B Kempler; W. James Brady, III; Frederick J. Telecky, Jr.

(57) ABSTRACT

A low inertia two axis torsional hinged device formed from a single piece of silicon. The two axis torsional hinged device uses a pair of diametrally charged permanent drive magnets to pivot a gimbals member of the assembly about first and second torsional hinges aligned along a first axis. A single drive magnet mounted at the center of the backside of an optical surface of the assembly pivots the optical surface about another pair of torsional hinges aligned along a second axis that is orthogonal to the first axis. The drive magnets mounted on the gimbals member are located on the first axis and the single drive magnet on the back side of the optical surface is mounted at the intersection of the first and second axis such that all three magnets are aligned along the first axis.

21 Claims, 6 Drawing Sheets

FIG. 5C
*(PRIOR ART)* ns systems.

TWO AXIS LOW INERTIA TORSIONAL HINGED OPTICAL DEVICE

TECHNICAL FIELD

The present invention relates to a two axis torsional hinged optical device and more particularly to an inexpensive low inertia torsional hinged optical device such as a mirror for positioning or pointing a light beam. Such pointing optical devices are particularly useful as optical switches in optical transmission systems.

BACKGROUND

The demands for dependable high band width and high speed communications systems increases daily. These demands are no longer simply the need for better vocal communications but also include the need for the high speed transmission of enormous quantities of digital data. As is well known by those skilled in the art, electrical conductive land lines have been inadequate for carrying the communication load for decades, and have been replaced by other high band width transmission techniques. One technique is the use of light to carry high speed data transmission, and such light or optical systems require "optical switches" to assure data transmitted from one location reaches its intended destination. A technique for optical switching is to selectively direct a light beam that is carrying information from one or more first optical fibers accurately and precisely to any selected fiber in a second group of optical fibers. Mirrors that receive a light beam and then reflect the light beam to any selected fiber of a group of fibers upon demand have been particularly effective for such optical switching.

Of course, as will be appreciated by those skilled in the art, unless the received light beam can rapidly be redirected from one fiber to another fiber, many advantages of using light as the transmission medium may be lost. In addition, it is important to keep the power or energy required to switch the light beam as low as possible. The need for the accurate positioning of a light beam onto any selected one of a large number of very small receiving optical fibers has typically required cumbersome, heavy, and relatively massive switching equipment. Of course, the use of such massive switching equipment is at odds with the need for high speed equipment and equipment requiring low energy.

Figure 5A:
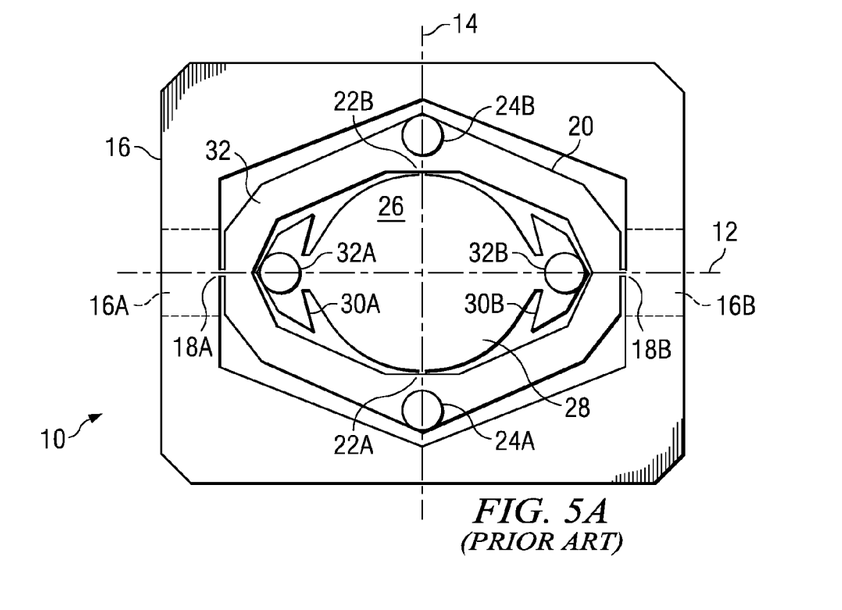
FIGS. 5A, 5B, and 5C illustrate a prior art dual axis torsional hinged device.

More specifically, referring to FIG. 5A, there is illustrated a prior art two axis optical device 10 having a first pivoting axis 12 and a second pivot axis 14 that is orthogonal to first axis 12. As shown, there is a support structure 16 defining first and second torsional hinges 18a and 18b lying along the first pivotal axis 12. Although shown as a frame that completely surrounds a gimbals member 20, the support structure 16 may instead comprise two support anchors 16a and 16b as shown in FIG. 5A. Also as shown in FIG. 5A, gimbals member 20 is supported by the torsional hinges 18a and 18b and, in turn, includes a second pair of hinges 22a and 22b that lie along the second pivotal axis 14 that is orthogonal to the first pivotal axis 12. Gimbals member 20 further includes a first pair of axial charged permanent magnets 24a and a second pair of axial charged permanent magnets 24b. As shown, these two pairs of permanent magnets 24a and 24b are spaced from the first pivotal axis 12. As will be appreciated, the gimbals member 20 is supported by the first and second torsional hinges 18a and 18b to allow rotation around the first pivotal axis 12. Therefore, the two pairs of magnets 24a and 24b provide considerable inertia with respect to pivotal motion around axis 12.

The pair of torsional hinges 22a and 22b defined by the gimbals member 20 pivotally support an optical portion 26 such as a mirror having a reflective surface 28 as shown, and a back side (not shown). As discussed above, the pair of torsional hinges 22a and 22b that support the optical portion or mirror 26 are aligned along the second pivoting axis 14. Also as shown, the optical portion 26 includes a pair of tabs 30a and 30b each of which supports a pair of permanent magnets 32a and 32b.

From the figure it is seen that the two pairs of permanent magnets 32a and 32b lie along first axis 12, but are also spaced away from the second pivoting axis 14 about which the optical portion 26 oscillates. Therefore, in the same manner as discussed above with respect to magnets 24a and 24b, there is also significant inertia created by spaced apart permanent magnets 32a and 32b with respect to pivotal motion around the second pivotal axis 14.

Figure 5B:
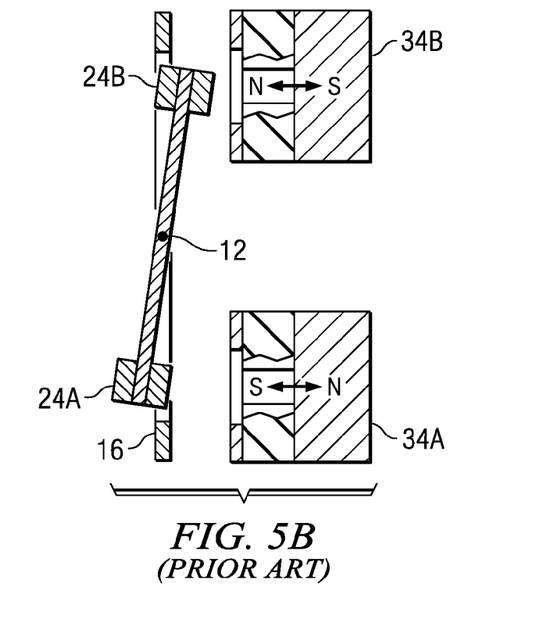
Figure 5C:
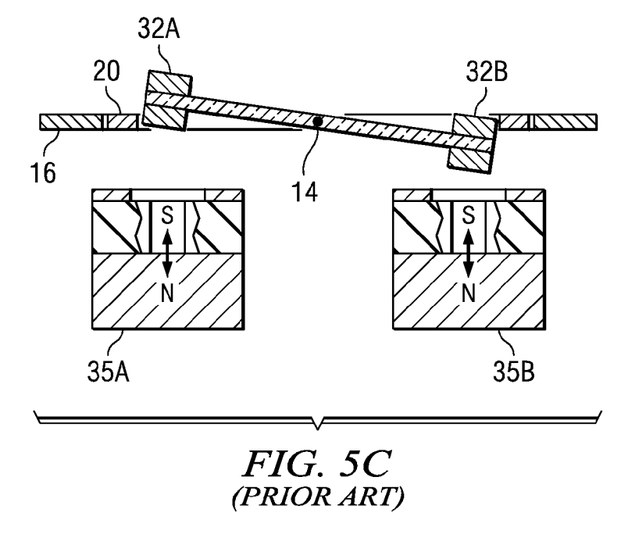

Referring now to FIG. 5B, there is shown a first side view of the gimbals member 20 and the optical portion 26 shown in FIG. 5A. Also shown in FIG. 5B are a pair of electromagnetic coils 34a and 34b that interact with the magnets 24a and 24b to create rotation of the gimbals member as shown in the figure. As can be seen from FIG. 5B, one magnet of the pair of magnets 24a is on the top side of the gimbals member and the second magnet of the pair is on the bottom side. This is also true for the other pair of permanent magnets 24b also shown in FIG. 5B. As also was mentioned, the pairs of magnets 24a and 24b are axially charged as shown in FIG. 5B such that the electromagnetic coils 34a and 34b can provide significant drive force to position the gimbals member 20. FIG. 5C is similar to 5B, except it illustrates the interaction of the two pairs of magnets 32a and 32b on the tabs 30a and 30b of the optical device 26 with magnetic coils 35a and 35b. However, as was discussed above, although the structure of FIGS. 5A, 5B, and 5C is balanced, the weight of the two magnet pairs 24a and 24b spaced away from the pivotal axis creates a significant moment of inertia in the structure, which of course requires more energy to drive and is, therefore, inherently slower because of the large moment of inertia.

Figure 6A:
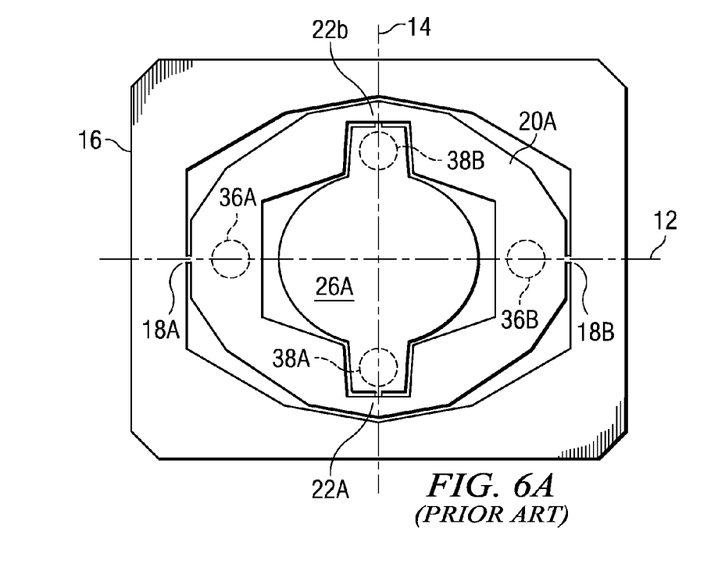
FIGS. 6A, 6B, and 6C illustrate another prior art dual axis torsional hinged device.
Figure 6B:
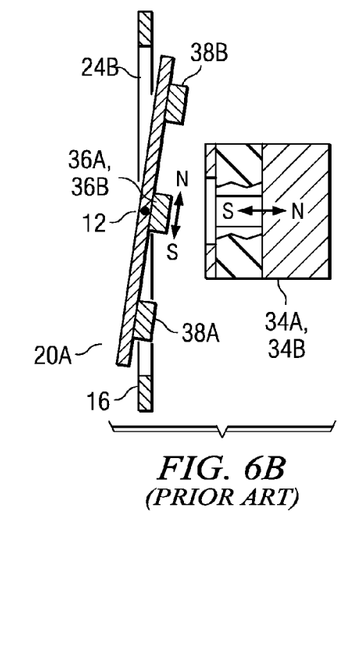

Referring now to FIGS. 6A and 6B there is shown a second prior art pointing optical structure or mirror having significantly reduced moment of inertia for the pivoting optical portion 26a. However, there is still a significant moment of inertia with respect to the pivoting of the gimbals member 20a around the first pivotal axis 12. Portions of the optical assembly of FIGS. 6A, 6B and 6C that correspond to similar structures from the assembly of FIGS. 5A, 5B, and 5C carry the same reference numbers. As shown, the optical assembly of FIGS. 6A and 6B still includes a support structure 16 that defines first and second torsional hinges 18a and 18b that support a gimbals member 20a. However, instead of being spaced away from the pivotal axis 12, the permanent magnets 36a and 36b for driving gimbals member 20a are located on the back side of gimbals member 20a as indicated by dotted lines. Also, as shown, the magnets 36a and 36b are located on the pivotal axis 12. Further, as shown in FIG. 6B, permanent magnets 36a and 36b are diametrally charged as indicated by the large double headed arrow running parallel to the gimbals surface. This is different than the axially charged permanent magnets 24a and 24b used in the example shown in FIGS. 5A, 5B, and 5C. Gimbals member 20a also defines a pair of torsional hinges 22a and 22b that support the optical portion 26a. However, as shown, drive magnets 38a and 38b used for pivoting the optical portion 26a are located on the pivotal axis 14 and on the back side of the optical portion 26a rather than being spaced away from axis 14 as was the case for the axially charged magnets 32a and 32b shown in FIGS. 5A, 5B, and 5C discussed above. Further, the permanent magnets 38a and 38b used for pivoting optical portion 26a are also diametrally charged rather than axially charged. It will be appreciated that by locating the drive magnet for both the gimbals member 20a and the optical portion 26a on their respective pivoting axis, the moment of inertia of the two structures is reduced.

Figure 6C:
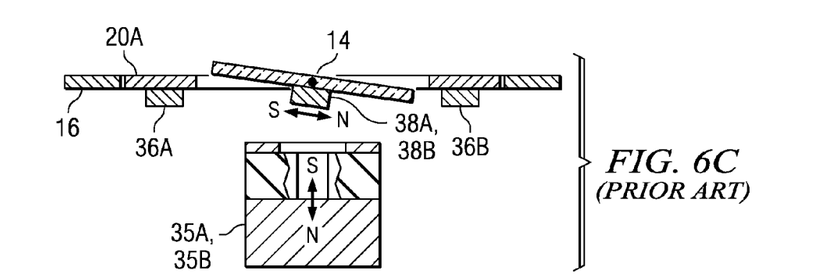

Further as shown and as mentioned above, the moment of inertia of the pivoting structure is further reduced by mounting a magnet only on the back side of the respective gimbals member 20a and optical portion 26a rather than a pair of magnets, one each on the top side and back side as was done in the prior art example of FIGS. 5A, 5B, and 5C. The use of a single magnet on the underside of the gimbals structure 20a and optical portion 26a may result in these structures being slightly out of balance, but this disadvantage is more than offset by the reduction in the moment of inertia of the structures. FIGS. 6B and 6C provide an illustration of the interaction of the diametrally charged magnets and the electromagnetic coils.

Although the moment of inertia for the individual optical portion structure 26a and the gimbals structure 20a is substantially reduced by placing the drive magnets on the corresponding pivoting axis of the structure, it will be appreciated, however, that the permanent magnets 38a and 38b, used to drive the optical portion 26a, are spaced a significant distance away from the pivotal axis 12 of the gimbals member 20a. Consequently, although the permanent magnets 36a and 36b used to pivot the gimbals structure 20a have been placed on the pivotal axis 12 to reduce the increased moment of inertia, this reduced moment of inertia is offset by the moment of inertia created by the drive magnets 38a and 38b of the optical portion 26a, which have now been spaced away from pivotal axis 12.

Therefore, it would be advantageous to provide an inexpensive, high speed, low inertia, optical device that can accurately and precisely direct a light beam to a selected location or receiving optical fiber.

SUMMARY OF THE INVENTION

These and other problems are generally solved or circumvented, and technical advantages are generally achieved, by preferred embodiments of the present invention, which provide for a two axis, low inertia, torsional hinged pointing optical device such as a mirror. The device comprises a support structure defining spaced apart first and second torsional hinges aligned along a first axis. A gimbals member is supported between the two spaced apart first and second torsional hinges such that the gimbals member can rotate or pivot about the first axis. The gimbals member also defines a pair of torsional hinges aligned along a second axis that lies substantially in the same plane as the first axis. The second axis intersects and is orthogonal to the first axis. The torsional hinges defined by the gimbals member support a optical portion, such as a mirror, having a reflective surface and a backside. The center of the optical portion is preferably located at the intersection of the first and second axis. As will be appreciated by those skilled in the art, the invention may be used advantageously with a variety of optical surfaces. In addition to standard flat mirrors, reflective lens having a defined curvature as well as continuous surface refractive lens where the light beam passes through the lens could be used with the invention.

First and second magnets are mounted on the gimbals member along the first axis, and a third magnet is mounted on the back side of the optical portion and is located at the intersection of the first and second axis such that all three of the magnets are aligned along the first axis and the magnet located on the back side of the optical portion is also located on the second axis.

The assembly further comprises first and second magnetic coils that are positioned to interact with the first and second magnets to provide the pivotal motion of the gimbals member about the first axis. A third magnetic coil is positioned to interact with the third magnet to provide the pivotal motion of the optical portion about the second axis.

Although the optical portion of this assembly is particularly useful for acting as a pointing mirror such that a light beam may be directed to a specific location and then redirected to a second specific location, it will be appreciated by those skilled in the art that this arrangement is also suitable for use with other types of scanning devices including scanning mirrors that pivot at their resonant frequency. Also as discussed above, other optical surfaces that may be used with the invention include a reflective lens having a defined curvature and a continuous surface refractive lens where the beam of light passes through the lens.

To alleviate stress on the optical surface that could cause deformation of the surface, a stress relieving groove may be defined in the back side of the optical portion that partially encircles the third permanent magnet. The groove, partially encircling the permanent magnet, may extend completely through the optical portion or may extend only part way through the thickness of the optical portion.

According to one embodiment of the invention, the support member, the gimbals member and the optical portion comprise a single unitary or integral piece of material, such as for example silicon.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
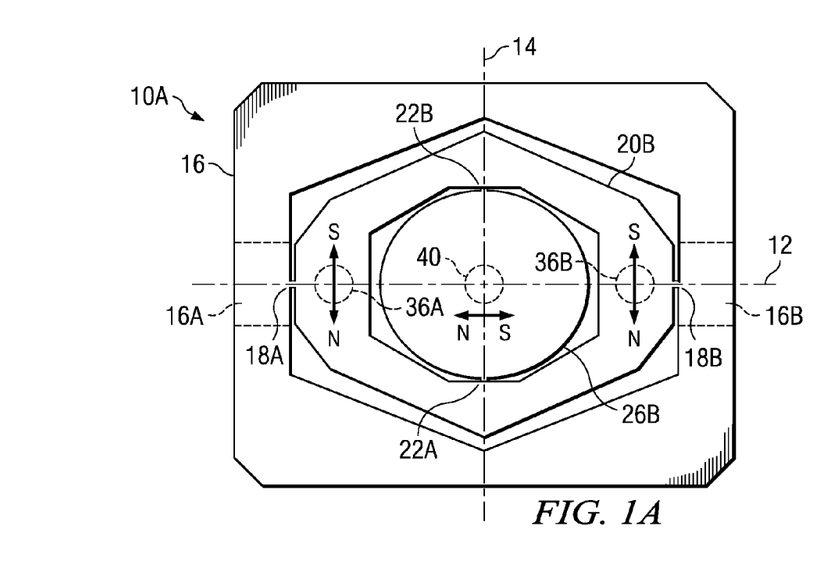
FIG. 1A illustrates a top view of the two axis low inertia optical assembly according to a first embodiment of the present invention.

Referring now to FIG. 1A, there is shown a front view of a first embodiment of the present invention. Elements of the embodiment of FIG. 1A that correspond to elements of the assemblies in FIGS. 5A, 5B, 5C, 6A, 6B, and 6C carry the same reference numbers. As shown the assembly 10a is a single piece of material such as silicon, and comprises a support member 16 that defines a first and second torsional hinges 18a and 18b. Although the support member 16 is illustrated as a frame that completely surrounds the gimbals member 20b, it will be appreciated that the support member 16 may comprise a pair of support anchors 16a and 16b indicated by dashed lines in FIG. 1A. As shown, gimbals member 20b is supported by first and second torsional hinges 18a and 18b. Gimbals member 20b further defines a pair of torsional hinges 22a and 22b that lie along a second pivotal axis 14 that is orthogonal to the first pivotal axis 12. Further, the pair of torsional hinges 22a and 22b defined by a gimbals member 20b, support an optical portion 26b such as a mirror. The optical portion 26b, which may for example include a reflective surface or mirror, may pivotally rotate about the second pivotal axis 14. Although particularly suitable as a pointing flat mirror device, the optical portion 26b may also comprise a reflective lens having a defined curvature or a continuous surface refractive lens where a light beam passes through the lens.

Gimbals member 20b further includes diametrally charged permanent magnets 36a and 36b that provide pivotal motion to the gimbals member around the first pivoting axis 12. However, unlike the prior art examples, optical portion 26b includes a single diametrally charged permanent magnet 40 located at the center of the optical portion 26b and at the intersection of the first pivotal axis 12 and the second pivotal axis 14, such that all three of the permanent magnets 36a, 36b, and 40 lie along the first pivotal axis 12, while the permanent magnet 40 used to drive the optical portion 26b also lies along the second pivotal axis 14.

Figure 1B:
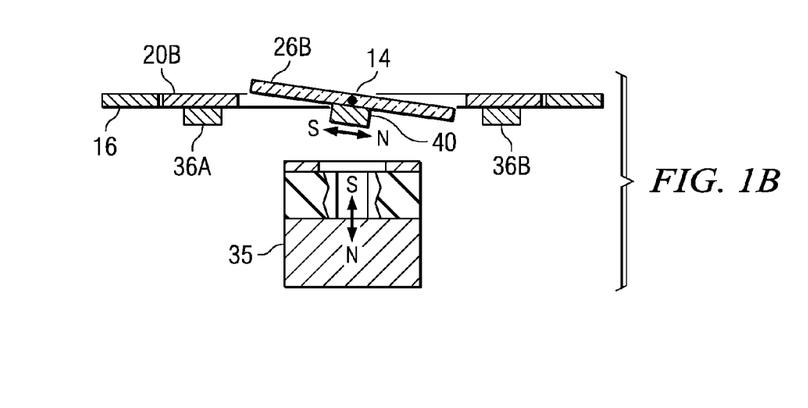
FIG. 1B is a first side view of the optical assembly of FIG. 1A and further includes the electromagnet drive coil for pivoting the optical surface portion of the assembly.
Figure 1C:
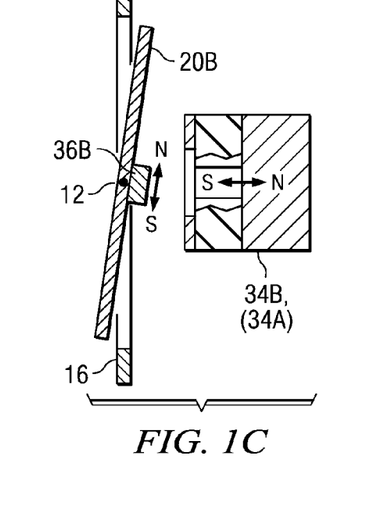
FIG. 1C is a second side view orthogonal to the first side view, and further illustrates one of the two electromagnet drive coils for pivoting the gimbals portion of the optical assembly.

Referring to FIGS. 1B and 1C, it can be seen that the magnets 36a, 36b, and 40 are all diametrally charged magnets and are all mounted to the underside gimbals structure 20b and optical portion 26b of the assembly 10a. More specifically as can be seen, permanent magnet 40 is mounted to the center of the back side of optical portion 26b and, therefore, does not interfere with the optical surface of the optical portion 26b. In addition, as can be seen, the moment of inertia of the gimbals member 20b is significantly reduced since there are no magnets offset from the pivotal axis 12 of the gimbals member 26b. FIG. 1B is a side view of the assembly of FIG. 1A and further shows the electromagnetic drive coil for pivoting the optical surface portion 26b of the assembly. FIG. 1C is a second side view and shows the electromagnet drive coil 34b that interacts with magnet 36b for pivoting the gimbals portion 20b of the assembly of this invention. The electromagnet drive coil 34a that interacts with magnet 36a is hidden from view.

It is also important to note the orientation of the N (North) and S (South) poles of the diametrally charged magnets located on the gimbals member is important. As shown in the figures, the N-S pole orientation of magnets 36a and 36b is aligned perpendicular to the pivot axis 12. However, it is also important to note that the N pole of magnet 36a is on the same side of the pivot axis as the S pole of magnet 36b. The orientation of the N and S poles of magnet 36a may be reversed if the orientation of magnet 36b is also reversed. That is, the N-S pole orientation of the magnets 36a and 36b should result in a N pole of one magnet and the S pole of the other magnet on the same side of the pivot axis 12. This arrangement is believed to reduce cross-talk between the three aligned magnets.

It will also be appreciated by those skilled in the art that the gimbals drive coils 34a and 34b should be wound in opposite directions so that the magnetic force generated to pivot the gimbals member 20b by the interaction of the two magnets and their corresponding coil rotate the gimbals member in the same direction. Since there is only one diametrally charged magnet used to drive the optical portion, it is only necessary to assure that N-S pole orientation is perpendicular to pivot axis 14.

Although, it is preferred to have the N-S pole direction reversed for the two gimbals magnets 36a and 36b, the system will still operate if the corresponding drive coils 34a and 34b are both wound in the same direction so that the magnetic field lines generated by the coils are in the same direction. However as discussed above, such an orientation will result in less pivotal force and cause more cross-talk.

Figure 2A:
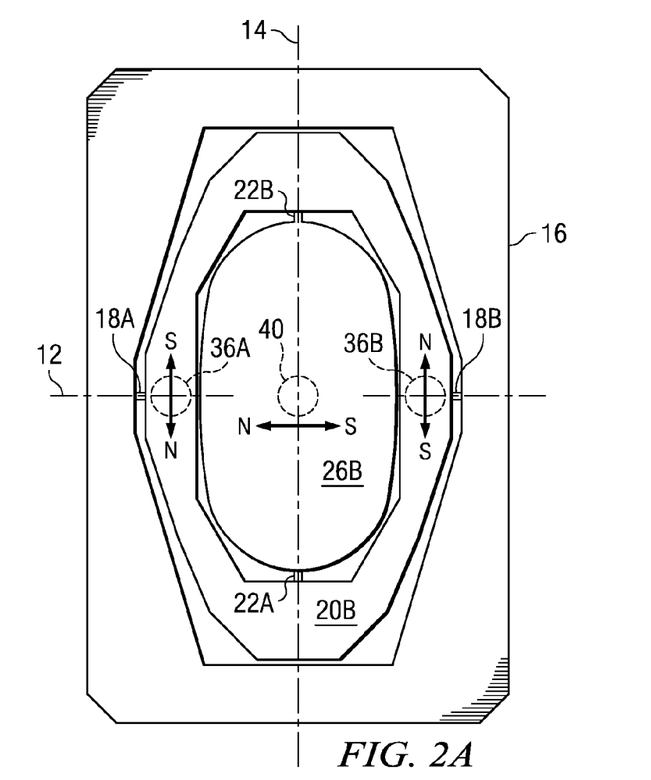
FIGS. 2A and 2B illustrate other embodiments of the invention having different shaped optical portions.
Figure 2B:
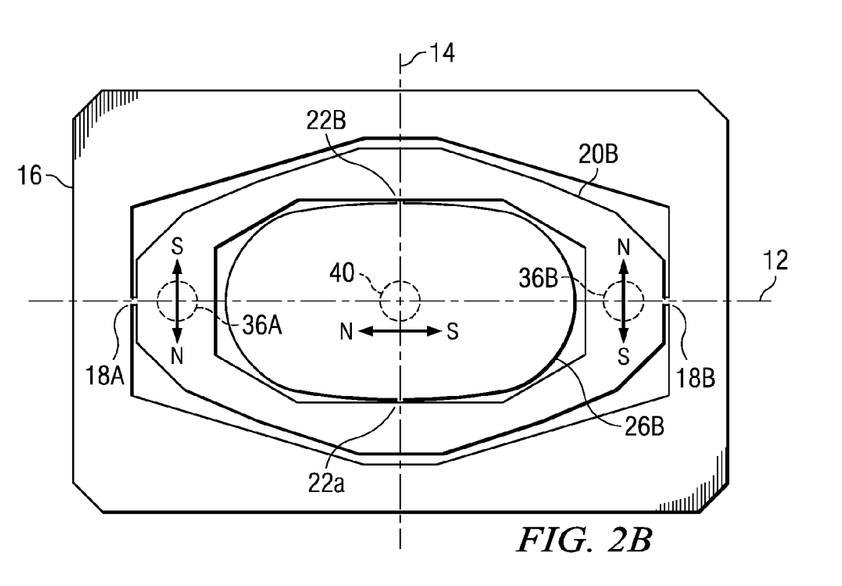

Referring now to FIGS. 2A and 2B there are illustrated two other embodiments of the invention having different shaped optical surfaces. As shown, FIG. 2A has a long dimension along the pivotal axis 14 of the optical portion, whereas the embodiment of FIG. 2B illustrates a long axis of the optical surface along the pivotal axis 12 of the gimbals member.

Figure 3:
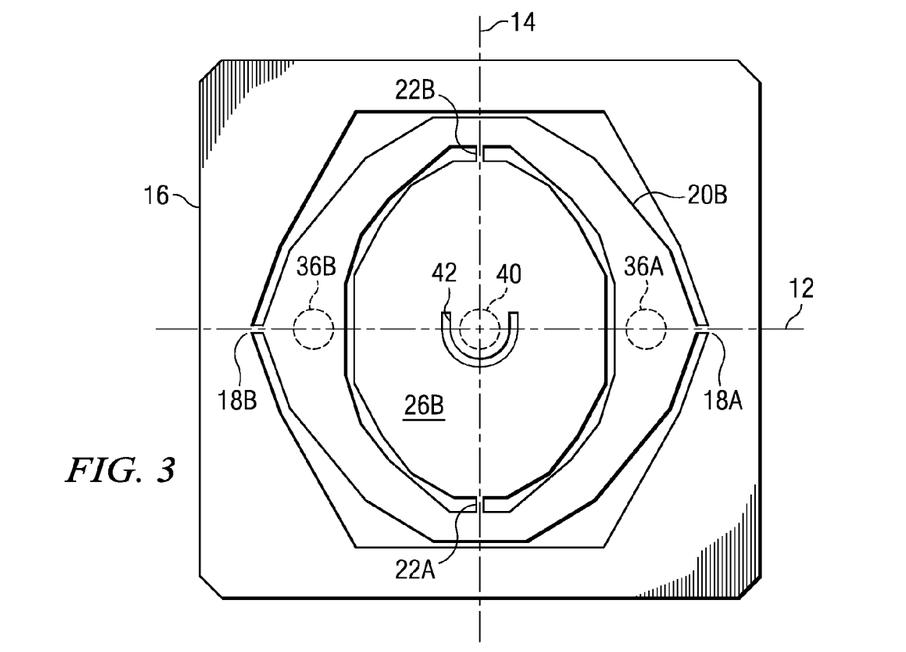
FIG. 3 illustrates the use of a stress relieving groove partially encircling the single magnet mounted on the back side of the optical portion.

Referring now to FIG. 3, there is shown a back view of a optical assembly of the present invention that further includes a groove 42 defined in the back side of the optical portion 26b. Groove 42 partially encircles the single permanent magnet 40. The groove may encircle as much of permanent magnet 40 as is necessary, and is illustrated in FIG. 3 as encircling about 270° of magnet 40. Of course more stress is relieved by the groove as more of the magnet is encircled. It will also be understood, of course, that the structure portion of the optical portion 26b that supports the magnet 40 is weakened if the groove encircles too much of permanent magnet 40. Further, the groove may extend completely through the optical portion's 26 thickness, or may extend only part way through so as to leave the front surface or reflective surface of the optical portion without the groove.

Figure 4A:
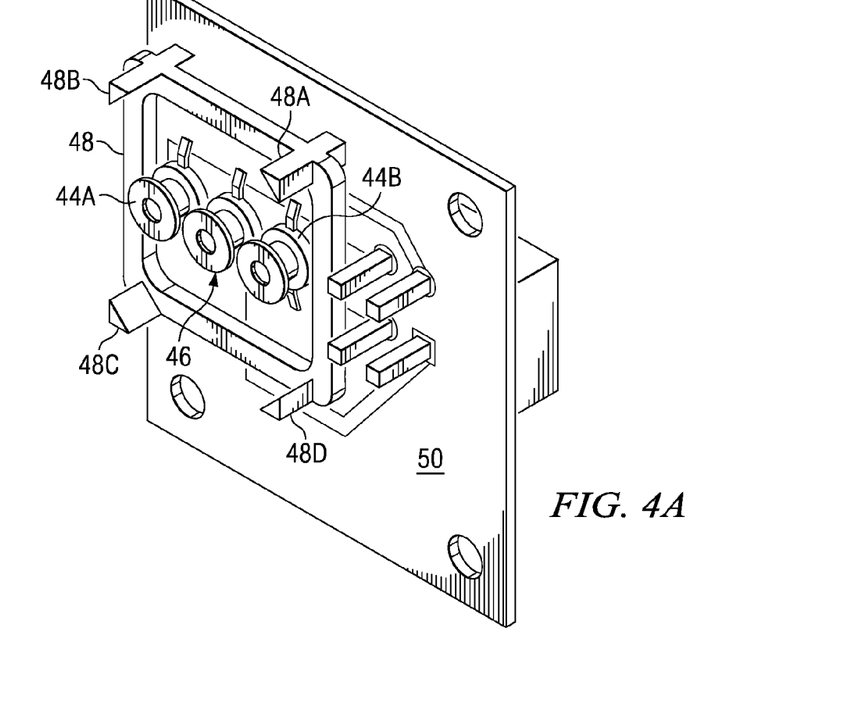
FIGS. 4A and 4B illustrate a compact assembly of three electromagnetic coils for two dimensional positioning of the optical portion according to the teachings of the present invention.
Figure 4B:
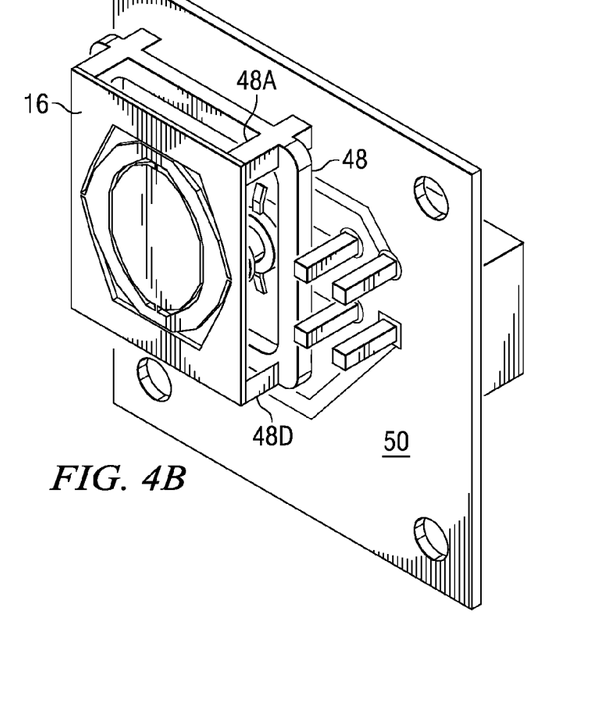

Referring now to FIGS. 4A and 4B there is illustrated a compact assembly for supporting electromagnet coils for two dimensional positioning of the optical surface. As shown, the magnetic coils 44a and 44b are positioned to interact with the permanent magnets 36a and 36b for pivoting the gimbals member 20b. The single center magnetic coil 46 drives the optical portion 26b and is located between the gimbals coils 44a and 44b. A mounting structure 48 is attached to the housing 50 and includes legs 48a, 48b, 48c, and 48d, which in turn are attached to the support member 16 of the device 10a. FIG. 4B illustrates the optical device of FIG. 3 in place on the support structure 48.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the optical assembly described in the specification. As one of ordinary skill in the art will readily appreciate from the disclosure of the present invention optical devices later to be developed, that perform substantially the same function or achieve substantially the same result as the corresponding embodiments described herein may be utilized according to the present invention. Accordingly, the appended claims are intended to include within their scope such optical devices.

What is claimed is:

1. A two axis pivoting torsional hinged device comprising:
   a support structure defining first and second torsional hinges aligned along a first axis;
   a gimbals member supported by and between said first and second torsional hinges, said gimbals member defining a pair of torsional hinges aligned along a second axis, said second axis lying in substantially the same plane and intersecting and substantially orthogonal to said first axis;
   an optical portion having a front side and a backside located between and supported by said pair of torsional hinges;
   first and second magnets mounted on said gimbals member along said first axis for pivoting said gimbals member about said first axis;
   a third magnet mounted on said backside of said optical portion and located at said intersection of said first and second axis for pivoting said optical portion about said second axis wherein each of said first, second, and third magnets are diametrally charged.

2. The device of claim 1 wherein said device is formed from a single piece of silicon.

3. The device of claim 1 wherein said optical portion comprises an optical member selected from the group consisting of a continuous surface refractive lens for passing a light beam there through, a flat mirror as the front side, and a reflective lens having a defined curvature as the front side.

4. The device of claim 1 wherein said first and second diametrally charged magnets have a N (North) pole, S (South) pole orientation that is perpendicular to said first axis.

5. The device of claim 1 wherein the North pole of said first magnet is on the same side of said first axis as the South pole of said second magnet.

6. The device of claim 1 wherein the third diametrally charged magnet has a N (North) pole, S (South) pole orientation that is perpendicular said second axis.

7. The device of claim 1 further comprising first and second magnetic coils positioned to interact with said first and second magnets to provide said pivotal motion of said gimbals member about said first axis, and a third magnetic coil positioned to interact with said third magnet to provide said pivotal motion of said optical portion about said second axis.

8. The device of claim 7 wherein said optical portion oscillates at a constant selected rate about said pair of torsional hinges.

9. The device of claim 8 wherein said optical portion oscillates at its resonant frequency.

10. The device of claim 7 wherein said optical portion is pivoted to and stopped at a selected angular position about said second axis by said third magnetic coil.

11. The device of claim 10 wherein said gimbals member oscillates at a constant selected rate about said first and second torsional hinges.

12. The device of claim 11 wherein said gimbals member oscillates at its resonant frequency.

13. The device of claim 7 wherein said gimbals member is pivoted to and stopped at a selected angular position about said first axis by said first and second magnets and said first and second magnetic coils.

14. The device of claim 1 and further comprising a groove formed in said optical portion to partially encircle said third magnet.

15. The device of claim 14 wherein said groove encircles said magnet for about 270 degrees.

16. The device of claim 14 wherein said optical portion has a selected thickness and said groove extends completely through said selected thickness.

17. The device of claim 14 wherein said optical portion has a selected thickness and said groove extends to a depth less than said selected thickness.

18. A torsional hinged device comprising:
   a support structure defining first and second torsional hinges aligned along a first axis;
   an optical portion having a selected thickness, a front side, a backside, and located between and supported by said first and second torsional hinges;
   a magnet mounted on said backside of said optical portion and along said first axis; and
   a groove formed in said optical portion partially encircling said magnet.

19. The device of claim 18 wherein said optical portion has a selected thickness and said groove extends completely through said selected thickness.

20. The device of claim 18 wherein said optical portion has a selected thickness and said groove extends to a depth less than said selected thickness.

21. The device of claim 18 wherein said groove encircles said magnet for about 270 degrees.

* * * * *